United States Patent

Sato et al.

[15] 3,699,648

[45] Oct. 24, 1972

[54] MEMORY DEVICE AND METHOD OF MAKING THE SAME

[72] Inventors: Kiichi Sato; Isamu Ogura, both of Tokyo, Japan

[73] Assignee: Oki Electric Industry Company Limited, Tokyo, Japan; by said Ogura

[22] Filed: July 31, 1970

[21] Appl. No.: 64,939

Related U.S. Application Data

[62] Division of Ser. No. 712,731, March 13, 1968, Pat. No. 3,611,326.

[30] Foreign Application Priority Data

March 15, 1967 Japan ......................42/15788

[52] U.S. Cl. ....................................29/604, 340/174

[51] Int. Cl. ............................H01f 7/06, G11c 5/06

[58] Field of Search ........................................29/604

[56] References Cited

UNITED STATES PATENTS

| | | | |
|---|---|---|---|
| 3,377,581 | 4/1968 | Boles et al. | 29/604 X |
| 3,391,398 | 7/1968 | Matsushita | 29/604 X |
| 3,378,629 | 4/1968 | Rask | 29/604 UX |
| 3,428,955 | 2/1969 | Oshimo et al. | 29/604 X |

*Primary Examiner*—Robert L. Spicer, Jr.
*Attorney*—McGlew and Toren

[57] ABSTRACT

A memory device includes at least one memory plane comprising a plurality of substantially parallel memory lines serving as digit lines and arranged in a common plane, and plural pairs of lead wires, serving as word lines, with one lead wire of each pair extending along only one surface of the plane and the other lead wire extending along only the opposite surface of the plane, whereby one lead wire of each pair overlies all the memory lines and the other lead wire of each pair underlies all the memory lines, with the lead wires intersecting the memory lines at right angles. Plural pairs of insulated strings extend in parallel relation between respective pairs of adjacent memory lines, with the strings of each pair extending alternately above and below adjacent pairs of lead wires and crossing each other between such adjacent pairs of lead wires to clamp the same in position therebetween. Plural memory planes may be interconnected by the memory lines and the insulated strings, in the form of a ribbon cable. At least some of the memory lines have a surface plating of a magnetic alloy, and the lead wires are insulated wires or tapes.

32 Claims, 40 Drawing Figures

INVENTOR
KIICHI SATO
ISAMU OGURA

BY McGlew & Toren

ATTORNEYS

PATENTED OCT 24 1972 3,699,648

SHEET 02 OF 10

INVENTOR
KIICHI SATO
ISAMU OGURA

BY McGlew & Toren

ATTORNEYS

INVENTOR
KIICHI SATO
ISAMU OGURA
BY McGlew & Toren
ATTORNEYS

INVENTOR
KIICHI SATO
ISAMU OGURA
BY McGlew & Toren
ATTORNEYS

INVENTOR
KIICHI SATO
ISAMU OGURA

BY McGlew & Toren

ATTORNEYS

INVENTOR
KIICHI SATO
ISAMU OGURA
BY McGlew & Toren
ATTORNEYS

INVENTOR
KIICHI SATO
ISAMU OGURA
BY McGlew & Toren
ATTORNEYS

INVENTOR
KIICHI SATO
ISAMU OGURA
BY McGlew & Toren
ATTORNEYS

INVENTOR
KIICHI SATO
ISAMU OGURA
BY M^c Glew & Toren
ATTORNEYS

INVENTOR
KIICHI SATO
ISAMU OGURA

BY McGlew & Toren
ATTORNEYS

MEMORY DEVICE AND METHOD OF MAKING THE SAME

RELATED U.S. APPLICATION

This is a division of application Ser. No. 712,731, filed, Mar. 13, 1968 now U.S. Pat. No. 3,611,326.

This invention also relates to devices wherein memory wires protected through pipes in weaving and to weave pipes instead of memory wires and after weaving the fabric is cut proper length then inserted memory wires in said pipes.

So above mentioned the plated wire memory fabrication has been put into automation and there need to be minimum hand works in weaving soldering and stacking.

This invention relates to memory devices and more particularly to a memory device wherein the elements include memory planes in which the warps are memory lines (digit lines), each made by electroplating or clothing a conductor with a magnetic film 1 to 3 microns thick, and insulated strings for securely binding and composing longitudinal and lateral lines, and the wefts are insulatively coated lead wires (word lines) for writing in and reading out memories.

The present invention further relates to a memory device wherein the steps of connecting memory lines, and word lines such as by soldering, are minimized.

In the memory device according to the present invention, no deformation by bending or impact is given to the memory lines and proper curves are given to the word lines so that the electromagnetic coupling between the memory lines and word lines may be closely kept and many memory planes of a large capacity and a high memory density may be continuously woven.

The present invention provides a memory device wherein a continuous fabric is made by weaving parts connecting many memory planes in the form of ribbon cables without cutting them and the memory planes are combined fixed zigzag into a memory stack so as to be used for both destructive reading and non-destructive reading.

BACKGROUND OF THE INVENTION

As shown in FIG. 1, a conventional woven memory plane is made by using insulatively coated lead wires 2 and space lines 3 as longitudinal lines, using memory lines $I_1$, $I_2$, $I_3$ and $I_4$ each coated with a magnetic film as lateral lines and passing the longitudinal lines alternately above and below the lateral lines and is fitted to a frame provided with many terminals and the respective memory lines and word lines are connected with the terminals in the frame so as to form a memory device.

In forming a memory device of a large capacity by thus making individual memory planes and connecting the memory lines and word lines of these memory planes in turn such as by soldering, there is a dis-advantage that not only the troubles are large but also defective soldering will cause troubles. Further, there is a wire memory plane made by laminating digit lines and word lines with Mylar films or by providing many slots in a base plate such as of an epoxy resin, arranging word lines such as by metal evaporation inside or outside the slots, applying insulative films to them and inserting memory lines each made by coating the surface of a lead wire with a magnetic film into the slots so as to be in the form of a matrix. However, such memory plane involves a great deal of difficulty during manufacture, and its cost per bit is high.

SUMMARY OF THE INVENTION

An object of the present invention is to provide a memory device wherein there is no or a minimum need of connecting the memory lines and word lines of memory planes in turn by soldering and the difficulties in making are very few.

Another object of the present invention is to provide a method of simply weaving memory planes.

A further object of the present invention is to provide a loom for making memory planes.

For an understanding of the principles of the invention, reference is made to the following description of typical embodiments thereof as illustrated in the accompanying drawings.

BRIEF DESCRIPTION OF THE DRAWINGS

In the drawings:

FIG. 13A is a partial perspective view of a device for alternating weft clamping strings in the upper and lower positions in replacing a shuttle;

DESCRIPTION OF THE PREFERRED EMBODIMENTS

Figure 1:
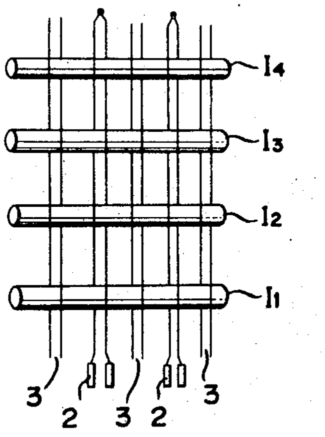
FIG. 1 is a partial schematic perspective view of a conventional woven memory plane.

A memory plane which is the base of the present invention and in which the defects of conventional memory devices are eliminated shall be explained with reference to FIGS. 2A–2E. As shown in the drawings, many continuous memory lines $4_1$, $4_2$, $4_3$, $4_4$ — — — are linearly and parallelly arranged in the longitudinal direction and, at the same time, pairs of word lines 5 and 5', 6 and 6', 7 and 7', 8 and 8', — — — having one line of each pair on each of the upper and lower side of each memory line are arranged in the direction at right angles with said memory lines, that is, in the lateral direction in the form of a matrix. The above mentioned memory line is a lead wire of a diameter of about 0.1 mm. plated on the surface with magnetic alloy such as of nickel and iron and has an easy magnetization axis in the peripheral direction. The above mentioned word line is an insulatively coated soft copper wire of a diameter of about 0.08 mm. or in the form of a tape.

Then, in order to compose a memory plane by binding the memory lines and word lines arranged in the form of a matrix as mentioned above, insulated strings $10a_1$, $10b_1$, $10a_2$, $10b_2$, $10a_3$, $10b_3$ — — — such as of plastic fibers are arranged respectively between the above mentioned memory lines and at both right and left ends. As shown in FIG. 2B, the insulated string $10a_1$ is stitched and advanced first from above the word line 5 to below the word line 6' and then from above the word line 7 to below the word line 8', the insulated string $10b_1$ is stitched and advanced first from below the word line 7' to above the word line 8 and these insulated strings $10a_1$ and $10b_1$ are properly fastened. Thus the memory lines and word lines are held. Therefore, the above mentioned insulated strings will properly curve the word lines and will keep the parallelism and insulation between the memory lines.

Figure 2A:
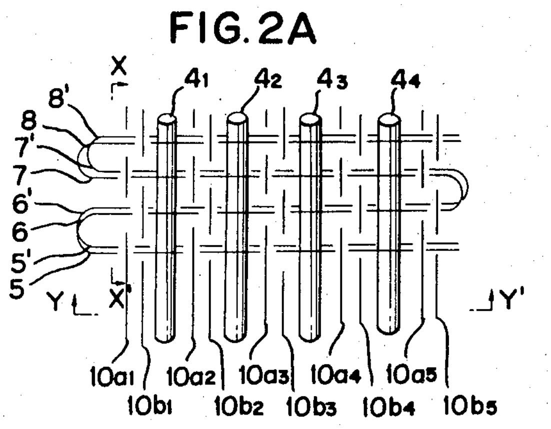
FIG. 2A is a partial schematic perspective view of a memory plane embodying the invention.
Figure 2B:
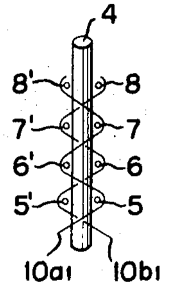
FIG. 2B is a sectional view taken on the line X–X′ of FIG. 2A.
Figure 2C:
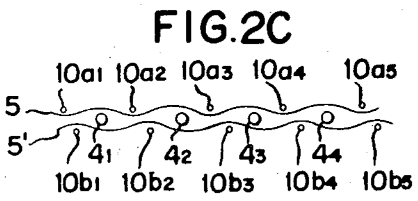
FIG. 2C is a sectional view taken on the line Y–Y′ of FIG. 2A.
Figure 2E:
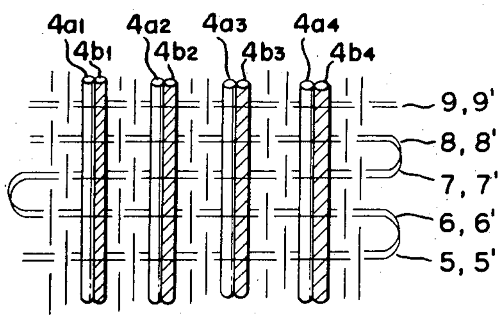
FIGS. 2D and 2E are views, similar to FIG. 2A, of modifications of the memory plane embodying the invention.
Figure 2D:
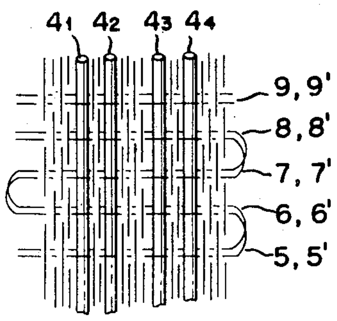

FIGS. 2D and 2E respectively show modifications of memory planes. FIG. 2D shows an embodiment wherein two insulated strings in the longitudinal direction are arranged between the memory lines $4_1$ and $4_2$ of the pair and between $4_3$ and $4_4$, four insulated strings are arranged between the digit lines (which shall be described later), that is, between the memory lines $4_2$ and $4_3$ and each of the intervals between the memory lines $4_1$ and $4_2$ and between the memory lines $4_3$ and $4_4$ is made smaller than the interval between the memory lines $4_2$ and $4_3$ (the interval between the digit lines) so that the obstructions between the adjacent digit lines and from outside may be reduced. The memory line density can be freely varied by varying the thicknesses and numbers of the memory lines and insulated strings and using a proper reed.

In FIG. 2E, one or both of two memory lines forming digit lines are insulatively coated and are parallelly arranged in close contact with each other so as to respectively form digit line loops. The memory lines $4a_1$ and $4b_1$, $4a_2$ and $4b_2$, $4a_3$ and $4b_3$ and $4a_4$ and $4b_4$ respectively form digit line loops.

If they are thus arranged, the impedance of the digit line loop will be reduced, the digit driving electric power can be made small, the obstructions to the word lines and adjacent digit line loops and from outside can be prevented and at the same time the memory line density can be made high. If one memory line of the above mentioned adjacent digit lines is made weak in the coercive force and the other memory line is made strong in the coercive force and the read-out word drive magnetic field is made weaker than the write-in word drive magnetic field, a stable nondestructive reading memory device can be made.

Further, one of the above mentioned adjacent digit lines can be made a memory line and the other can be made a mere insulatively coated lead wire.

Figures 3A, 3B:
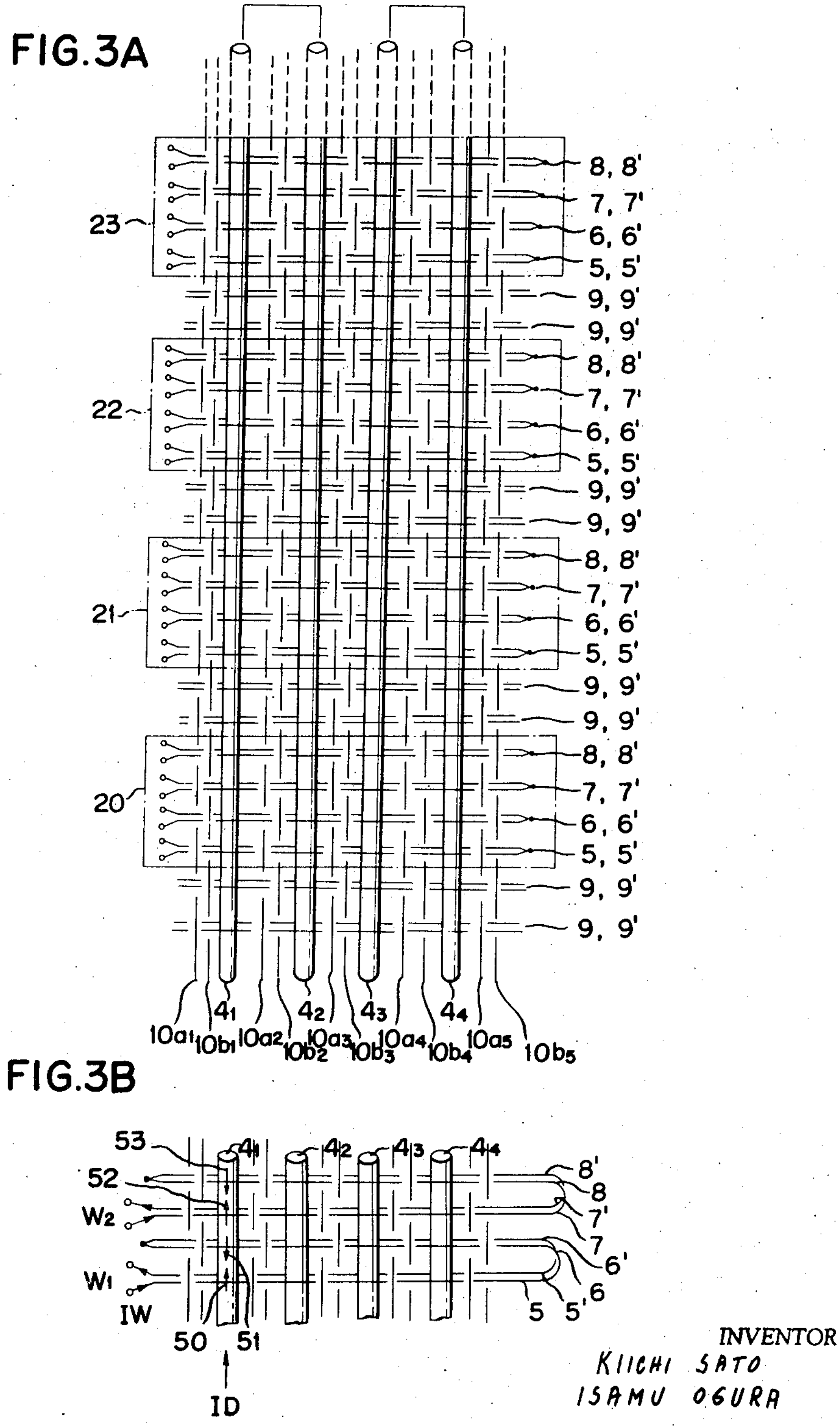
FIG. 3A is a partial perspective view schematically illustrating a plurality of memory planes embodying the invention as connected with each other.
FIG. 3B is a partial schematic perspective view of a further modification of the invention.

FIGS. 3A and 3B shows a fundamental connecting method for a memory plane formed as in FIGS. 2A–2E. FIG. 3A shows four memory lines $4_1$, $4_2$, $4_3$ and $4_4$, four pairs of word line pairs (The loop made by winding the memory line group by one round with the upper and lower word lines shall be called a word line pair hereinafter.) 5 and 5', 6 and 6' 7 and 7' and 8 and 8' and plastic fibers 9 and 9' woven in the form of ribbon cables between planes. The memory lines, word line pairs and plastic fibers can be increased to any number. The same insulatively coated soft copper wires as the word lines may be used for the plastic fibers 9 and 9'.

The memory lines and insulated strings in the longitudinal direction are connected in common to each memory plane forming a memory stack as shown in FIG. 3A. further, the word line is cut at both ends of the memory plane and, as shown in FIG. 3A, one end is made a lead line for passing a word drive current and the other end is connected such as by soldering to form a word line loop.

When a word drive current is supplied to one end of a word line of the memory device formed and connected as shown in FIG. 3A, for example to one end of the word line pair 5, 5' of memory plane 20, a (+) or (−) information current flows through memory lines $4_1$, $4_2$, $4_3$ and $4_4$. If the word drive current and the information are stopped, at each intersection of the word line pair 5,5' with memory lines $4_1$, $4_2$, $4_3$ and $4_4$, of memory plane 20, a (+) or (−) output voltage, corresponding to the direction of rotation of the magnetizing vector memorized in the memory line, will be generated.

If the strength of the magnetic field resulting from the word drive current is selected so as to have no influence on the strength of the magnetization memorized in the memory line, nondestructive reading will be possible. In case the magnetic field resulting from the word drive current has an influence on the strength of the magnetization memorized in the memory line, destructive reading will be made. It is as well known that, in such case, the information read out is once transferred to a register and then re-writing-in is effected by this information. It is needless to say that it is the same also with the loop of each of the word line pairs 6 and 6', 7 and 7' and 8 and 8'.

If lead plates are provided respectively on the backs of the base plates of the memory planes 20, 21, 22 and 23 and are connected in turn, the memory lines $4_1$, $4_2$, $4_3$ and $4_4$ are connected at one end to the lead plates and these lead plates are made a common return circuit, one memory line will be able to be used as one digit line. But, in such case, the output voltage will be low and an obstruction from outside will be likely to result. If, as in FIG. 3A, two adjacent memory lines $4_1$ and $4_2$ or $4_3$ and $4_4$ are paired to be one digit line and this pair is used as connected at one end in the form of a loop, the output will be doubled and the obstruction from outside will be in a common mode and can be eliminated or reduced.

FIG. 3B is an explanatory view showing another connecting method for memory planes. The connecting method for word line pair sets $W_1$ and $W_2$ (A set of coils for driving words made in the form of a loop by combining a plurality of word line pairs shall be mentioned as a word line pair set hereinafter. However, it shall be briefly mentioned as word lines when it is not confused.) has a feature that, when there is a spiral skew of a fixed angle in the memory lines $4_1$, $4_2$, $4_3$ and $4_4$, or when a magnetic field is applied from outside by the ground magnetism or the like, even if the direction of the word drive current $I_W$ is reversed, the read-out output will not vary. Generally, when there is such skew of external magnetic field as is mentioned above in the memory line, if the word drive current is reversed, a difference will be produced in the read-out output. However, if they are connected as in the drawing, the influence of the skew or external magnetic field will be cancelled. That is to say, in the drawing, if "I" is written in at the intersections 50 and 51 of the word line $W_1$ and the memory line $4_1$ by making the word drive current $1_W$ flow in the direction indicated by the arrow through the word line $W_1$ and making the digit drive current $I_D$ flow in the direction indicated by the arrow through the word memory line $4_1$, as seen in the direction of $I_D$ indicated by the arrow, on the periphery of the memory line $4_1$, both of the above mentioned skew or external magnetic field, the memorized magnetization vector will incline by an angle 0 from the direction of the word line.

If the word drive current $I_W$ is made to flow in the direction indicated by the illustrated arrow through the word line pair set $W_1$ for reading out, as the direction of the word drive magnetic field is reversed at the above mentioned intersections 50 and 51, due to the above mentioned skew angle 0, the output at one intersection will become larger and the output at the other intersection will become smaller. If the direction of the word drive current $I_W$ is made reverse to the illustrated direction, the output at one intersection will become smaller and the output at the other intersection will become larger but the resultant output at the above mentioned two intersections 50 and 51 will be the same. This relation is the same with the intersections 52 and 53 of the word line pair set $W_2$ and is also the same with the other memory lines $4_2$, $4_3$ and $4_4$.

In the same manner, it can be understood from the above mentioned explanation that, even in the case of memorizing "0" by making the direction of the digit drive current $I_D$ reverse to that in FIG. 3B, there will be produced no difference in the read-out output by reversing the word drive current. In FIG. 3B, the word line pair sets $W_1$ and $W_2$ are formed of one reciprocating word line pair but it is evident that two or more word line pairs (the word line pairs are of an even number) may be made one word line pair set.

Figure 4A:
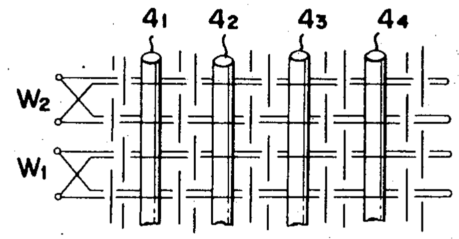
FIGS. 4A through 4D are partial perspective views schematically illustrating various arrangements of the lead wire pairs.

The memory device according to the present invention will become more concretely clear in the later described explanation of the producing method. In order that each word line may be of multi-turns as shown in FIGS. 4A–4D, more word line pairs will be required and therefore the present invention will be applied more effectively. FIGS. 4A, B, C and D are perspective views of memory planes showing embodiments of the present invention.

FIG. 4A illustrates the case in which two word line pairs woven at uniform intervals are connect in parallel to be one word line pair set. If they are connected in this manner, the impedance of the word lines will reduce, the rising time of the word drive current will be shortened, the word drive current will be increased, thereby the cycle time of the write-in and read-out time can be shortened and at the same time, the output will increase and will be uniform.

Figure 4B:
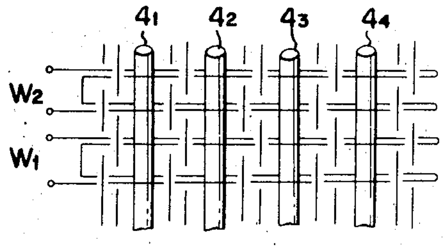

FIG. 4B illustrates the case in which two word line pairs are connected in series to be one word line pair set. If they are connected in this manner, the cycle time will somewhat increase but the word drive current will decrease and the output will increase and will be uniformed.

Figure 4C:
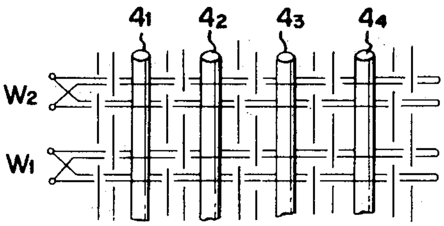
Figure 4D:
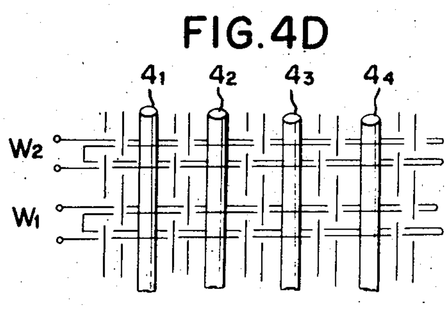

FIGS. 4C and 4D illustrate the case in which two word line pairs are respectively closely woven and are connected in parallel or series to form one word line pair set. Thereby not only there will be the advantage of the connection is FIG. 4A or 4B but also the magnetic interference between the adjacent bits on the digit line can be reduced.

The variation of the density of the word line pairs as in the above can be easily accomplished by adjusting or partly modifying the winding device of the later described loom.

In the above explanation, the digit line is a memory line and the word line is an insulatively coated lead wire. But, it is needless to say that, even if, contrary to the above, an insulatively coated lead wire is used for the digit line and such fine magnetic alloy wire or tape as, for example, of Permalloy is used for the word line, many continuous memory planes will be able to be made by the following producing method.

A method of making memory devices according to the present invention shall be explained in the following.

Figure 5:
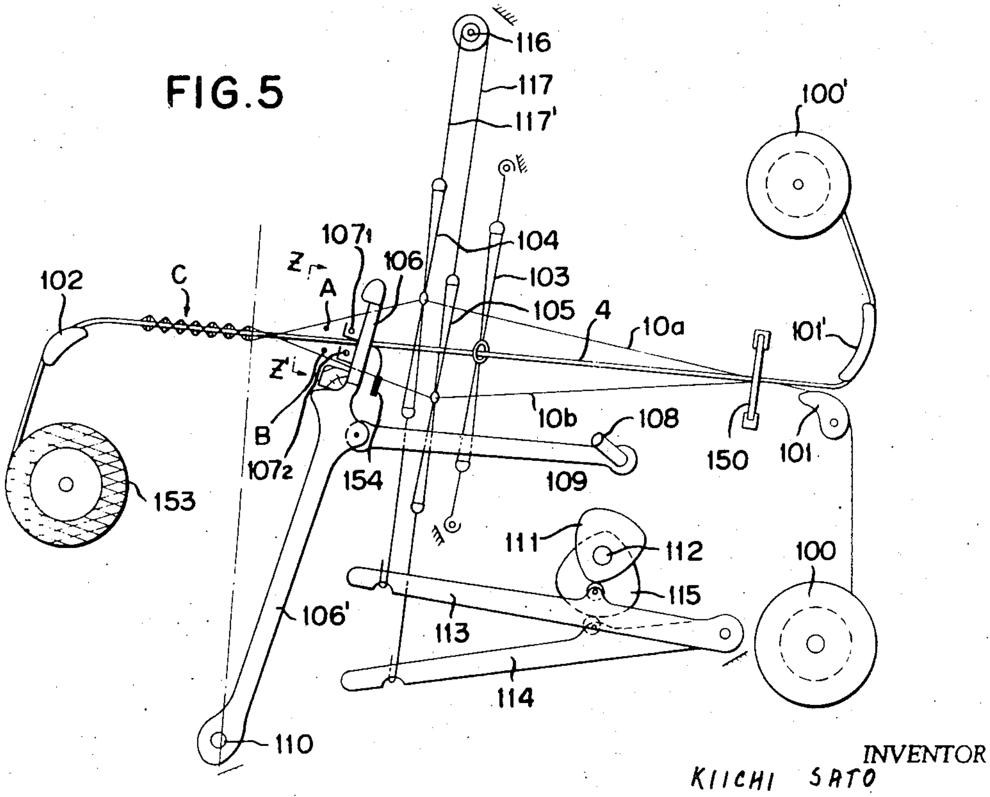
FIG. 5 is a somewhat schematic elevation view of a loom for forming a memory plane in accordance with the invention.

FIG. 5 is a brief explanatory view of a loom to be used to make memory devices. Many continuous strings are wound on a winding roller 100. One memory line is wound on each of many reels 100' (only one of them is shown in the drawing). A braking device is applied to each reel 100' so as to keep a proper tension. Memory lines will start from the reel 100' so as to keep a proper tension. Memory lines will start from the reel 100', will pass through a fixed back beam 101', fixed reed 150 for arranging warps in order, fixed heddle 103 and clearances of a reed 106 for beating in wefts and will be wound up on a winding roller 153 through a breast beam 102 as a fabric C. The memory lines 4 ($4_1$, $4_2$, $4_3$ and $4_4$ in FIG. 2) will be arranged always straight and will not be subjected to any bending and impact between the fixed back beam 101' and breast beam 102. Further, the reel 100', back beam 101', breast beam 102 and winding roller 153 have proper length radii so that the magnetic characteristics of the memory lines may not deteriorate during the production.

Insulated strings 10*a* and 10*b* (the insulated strings $10a_1$, $10b_1$, $10a_2$, $10b_3$, — — — in FIG. 2A) will pass through a rocking back beam 101 and the fixed reed 150, will then pass through shedding heddles 104 and 105 moving respectively alternately up and down and through the reed 106 for beating in wefts and will be wound up on the winding roller 153 through the breast beam 102 as the fabric C. The shedding heddles 104 and 105 will move alternately up and down for each weft beating so that one group of the insulated strings $10_a$ and $10_b$ may be pulled upward of the center of the memory lines and the other group may be pulled downward, symmetrically. Therefore, two upper and lower sheds A and B will be formed of the three of the memory line group 4 and insulated line groups $10_a$ and $10_b$. Shuttle $107_1$ and $107_2$ for feeding word lines to be wefts are shown in detail in FIG. 6.

The above mentioned reed 106 and shedding heddles 104 and 105 will operate as follows. A connecting rod 109 operated by a crank shaft 108 is connected with a reed frame leg 106' which is integral with the above mentioned reed 106 and which is borne by a shaft 110 so that said reed frame leg 106' may make one horizontal reciprocation of the reed 106 for the weft beating motion every one rotation of the crank shaft 108. Further, a cam 111 is operatively connected with the above mentioned crank shaft 108 so as to make one-half rotation for one rotation of crank shaft 108 to operate a lever 113. A cam 115 acting on a lever 114 is fixed to a cam shaft 112 so that the cams 111 and 115 may respectively act in directions reverse to each other on the levers 113 and 114. That is to say, when the cam 111 acts on the lever 113, the cam 115 will not act at all on the lever 114 and, on the other hand, when the cam 115 acts on the lever 114, the cam 111 will not act at all on the lever 113. On the other hand, as evident from FIG. 5, the shedding heddle 104 is connected at one end to the lever 113 and at the other end to one end of the shedding heddle 105 through a pulley 116 and hanging straps 117 and 117' and the shedding heddle 105 is connected at the other end to the lever 114. Therefore, in case the crank shaft 108 makes one rotation and the reed 106 makes a weft beating motion of one horizontal reciprocation, the cam shaft 112 will make a half rotation so that the cam 111 may push down the lever 113. The motion of pushing down said lever 113 will pull up the lever 114 through the above mentioned hanging straps 117 and 117'. With one rotation of the crank shaft 108 in the next step, the cam 115 will push down the lever 114 so that the lever 113 may be pulled up to the position shown in FIG. 5. Such motion will induce the vertical reciprocating motion of the shedding heddles 104 and 105 so that, in the sheds in two stages with the memory line group 4 in the center, the positions of the insulated string groups $10_a$ and $10_b$ for memory line group 4 may be alternately moved up and down.

Figures 6A, 6B, 7A, 7B:
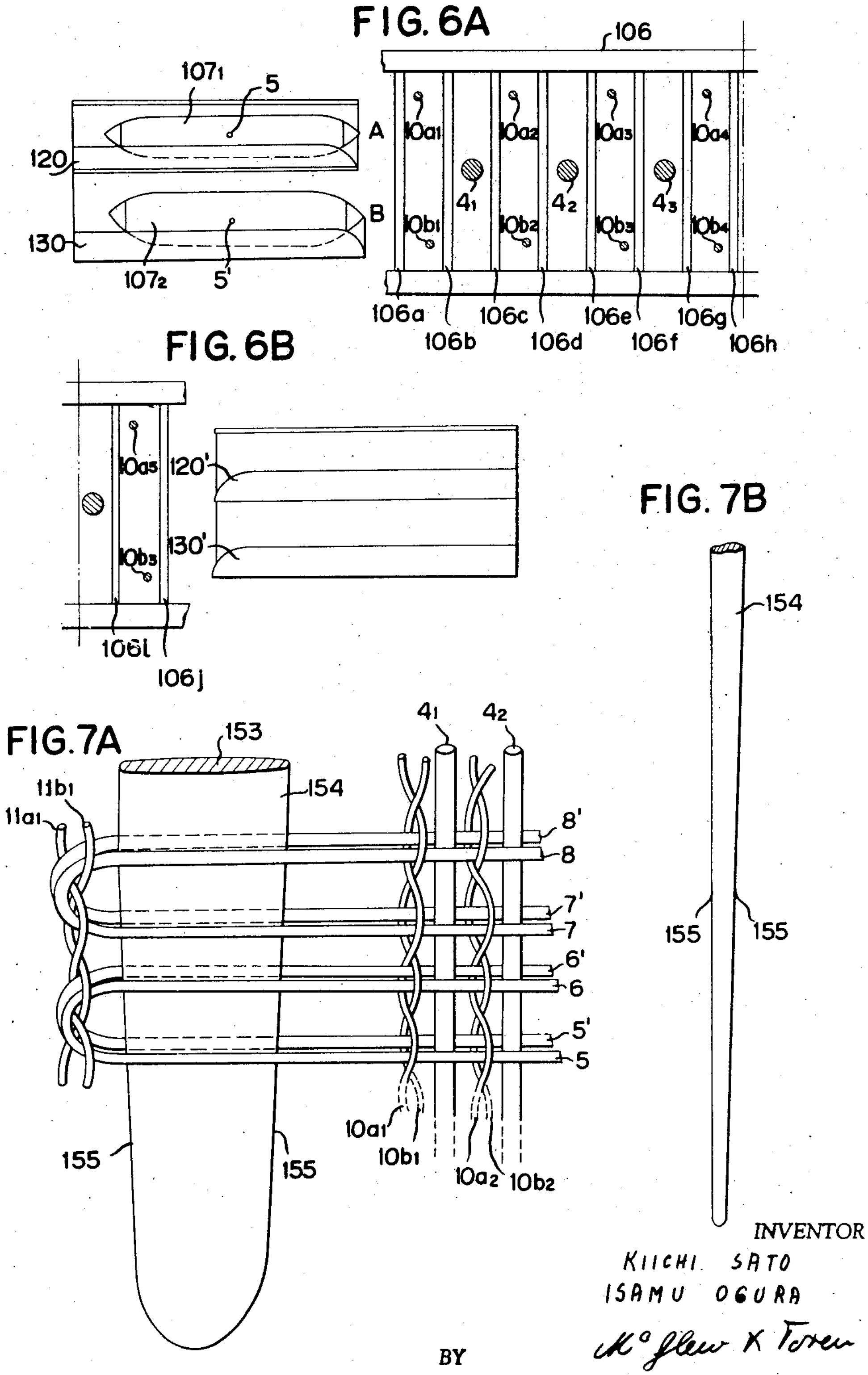
FIGS. 6A and 6B conjointly represent a sectional view taken on the line Z–Z′ of FIG. 5.
FIG. 7A is an enlarged partial perspective view illustrating a tenterhook in operative association with a pair of weft clamping strings.
FIG. 7B is a side elevation view, partly in section, of the tenterhook.

In the above mentioned two-stage sheds A and B, shuttle box devices in a known loom are provided as shown briefly in FIGS. 6A and 6B which constitute a schematic view as seen from line Z – Z' in FIG. 5.

In the upper shed A for the memory lines $4_1$, $4_2$, $4_3$ and $4_4$ to be warps, right and left shuttle boxes 120' and 120, are provided, and, at the same time, in the lower shed B below it, right and left shuttle boxes 130' and 130 are provided. In shuttle box 120 is contained a shuttle $107_1$ to move from this shuttle box to the above mentioned shuttle box 120'. Further, in the above mentioned shuttle box 130 is contained a shuttle $107_2$ to move from this shuttle box to the above mentioned shuttle box 130'. The word lines to be wefts will be continuously wound on these shuttles $107_1$ and $107_2$ and the shuttles will be moved from these shuttle boxes to the respective opposed shuttle boxes whenever one weft beating motion of reed plates $106_a$, $106_b$, $106_a$ — - - $106_j$ ends so that the word lines which are the wefts may be arranged above and below the memory lines $4_1$, $4_2$, $4_3$ and $4_4$ which are the warps.

Now, for the convenience of the explanation, assume that the word lines are arranged by the movement of the shuttle $107_1$ from the shuttle box 120 to the shuttle box 120' above the memory line group 4 in the shed A and are arranged by the movement of the shuttle $107_2$ from the shuttle box 130 to the shuttle box 130' below the memory line group 4 in the shed B. In such state, when the reed 106 makes the weft beating motion of the word lines by one rotation of the crank shaft 108, the shedding heddles 104 and 105 will be alternated above and below so that the positions of the insulated string groups $10_a$ and $10_b$ may be made reverse to each other and the word lines arranged in the above mentioned sheds A and B may be combined with the memory line group 4 so as to be held by the insulated string groups $10_a$ and $10_b$. In such case, the shuttles $107_1$ and $107_2$ will move respectively from the shuttle box 120' to the shuttle box 120 and from the shuttle box 130' to the shuttle box 130 so as to arrange the word lines above and below the memory lines. The reed plates $106_a$, $106_b$ — — — $106_j$ will make a weft beating motion and, due to the movement of the shedding heddles up and down, the insulated string groups $10_a$ and $10_b$ will move in the reverse positions so as to hold the word lines against the memory lines. By repeating such motion, the memory plane in FIG. 2A will be woven. In order to thus weave one memory plane and then to weave the part between such memory planes in the form of a ribbon cable, the object can be attained by weaving them by replacing the two upper and lower shuttles $107_1$ and $107_2$ for word lines with two other shuttles for insulated strings by a manual or automatic shuttle replacing system.

Additional devices required to effectively operate the above mentioned loom shall be explained in the following.

As well known in a fiber loom, after the weaving, by the crossing of warps and wefts, the wefts will be curved and the moven width will shrink. If the woven width shrinks remarkably in the woven end, the warps near both ends of the reed will produce friction with the reed plates and will be broken. In weaving fibers, in order to prevent the shrinkage of the woven width in the woven end, roller tenterhooks or ring tenterhooks on which needles are planted are used. However, in weaving memory planes, such tenterhooks will damage the memory lines and word lines and therefore can not be used.

Figure 8:
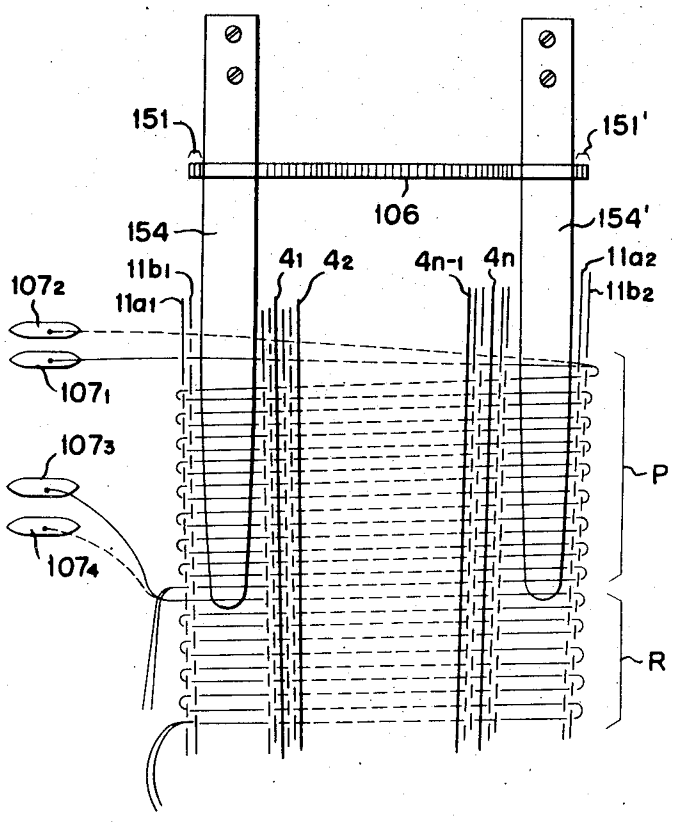
FIG. 8 is a schematic plan view illustrating the weaving of a memory plane embodying the invention.
Figure 9:
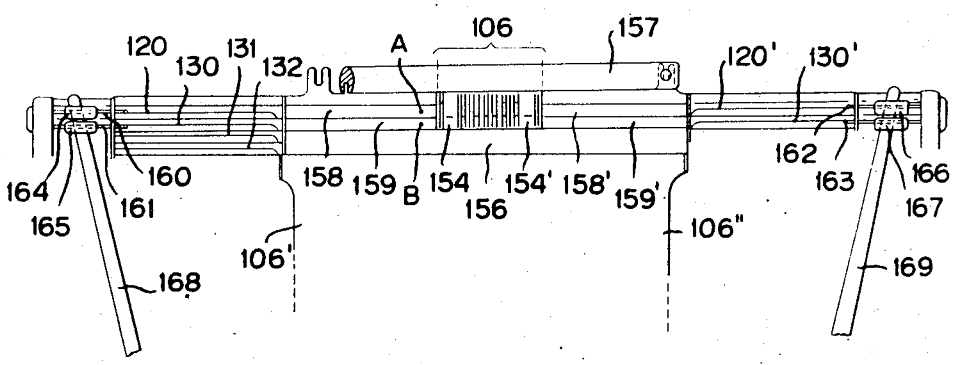
FIG. 9 is a somewhat schematic elevation view illustrating shuttle operating means.

154 shown in FIGS. 5, 7A, 7B, 8 and 9 is a tenterhook developed specifically for memory devices. Each of tenterhooks 154 and 154' in a pair in FIG. 8 is made by finishing the tip of a stainless steel plate about 4 mm. thick and about 15 mm. wide so as to be in the form of a sword blade. As shown in FIGS. 5 and 9, it passes through the clearance of the reed 106 and is securely fixed at the rear end to the body of the loom by means of an L-shaped metal piece. Outside the tenterhooks 154 and 154', as shown in FIG. 8, there are several reed plates 151 and 151' at both ends of the reed 106 and through the clearances of said reed plates passed weft clamping strings $\mathbf{11a_1}$, $\mathbf{11b_1}$, $\mathbf{11a_2}$, and $\mathbf{11b_2}$ shown in FIGS. 7A and 8. The weft clamping strings $\mathbf{11a_1}$ and $\mathbf{11b_1}$ will be passed respectively through the shedding heddles 105 and 105, will be shed alternately up and down in the same manner as the insulated string groups $\mathbf{10_a}$ and $\mathbf{10_b}$ and will form the sheds A and B to clamp the word line pairs 5 and 5', 6 and 6', 7 and 7' and 8 and 8' as shown in FIG. 7 and prevent the shrinkage of the woven width. As the weft clamping strings are wound up on the winding roller 153 (FIG. 5) together with the fabric, they will make it easy for the fabric to disengage from the tenterhooks. For the weft clamping strings, rather thick twisted nylon yarns have shown favorable results. In each of FIGS. 7A and 8, one set of weft clamping strings is shown. However, many sets of weft clamping strings may be used. As the edge part of each of the tenterhooks 154 and 154' is tapered as shown in FIG. 7A, when the fabric is wound up, the tension of the wefts will be gradually released, the wefts will be gradually bent by the tension of the insulated string groups $\mathbf{10_a}$ and $\mathbf{10_b}$ woven in as warps and the electromagnetic coupling between the memory lines and word lines will be made closely. Each of the tenterhooks 154 and 154' is fixed at the rear end to the body of the loom as described above, is in the form of a sword blade, has a taper 155, is smoothly finished on the sides to be in such flat elliptic form as is shown in FIG. 7B so that the fabric may naturally disengage from the tenterhooks as it is wound up and is made gradually thinner in the thickness of the tip part so as to be in the form of a blade so that the fabric may easily disengage.

As the tenterhooks 154 and 154' are parallel with the memory line group 4 as shown in FIGS. 5 and 7, when the shuttle $\mathbf{107_1}$ for the upper stage moves horizontally alternately between the shuttle boxes 120 and 120' on the upper stage, the bottom surface of said shuttle will be prevented from coming into contact with the memory line group and will be made smooth in running. Therefore, when a wide memory plane is to be woven, if such tenterhook is provided also in the middle of the reed 106 as described later with reference to FIGS. 10A–10B, the upper stage shuttle 107 will be made smooth in running and at the same time the deterioration of the memory characteristics by the contact of shuttle with the memory lines will be able to be prevented.

FIG. 9 is an explanatory view of an additional device for operating the shuttle. In the drawing, the reed 106 is in the middle part and on both sides of this reed are clearances for passing the tenterhooks 154 and 154'. When a wide memory plane is to be woven, such clearances and tenterhooks should be provided in the middle part or several proper places of reed 106. In the lower part of the reed are a shuttle race and reed frame 156 so that the shuttle 107 reciprocating between the lower stage shuttle boxes 130 and 130' may be positive in running. In the upper part of the reed 106 is a reed cap 157. The reed 106 is held as fitted in the lower part in a groove in the reed frame 156 and fitted in the upper part in a groove in the reed cap 157. The reed frame 156 and reed cap 157 are fixed to the reed frame legs 106' and 106'' with bolts and nuts. On both sides of the reed 106 are upper stage slays 158 and 158' and lower stage slays 159 and 159' fixed respectively to the reed frame legs 106' and 106''. The above mentioned fixed slays will guide the running of the shuttles $\mathbf{107_1}$ and $\mathbf{107_2}$ and will make it easy to take out and insert the shuttles in supplying the wefts. On the left side of the fixed slay 158 and 159 are four-stage shuttle boxes 120, 130, 131 and 132 moving up and down. On the right side of the fixed slays 158' and 159' are fixed two-stage shuttle boxes 120 and 130'. In the above mentioned four-stage shuttle boxes, for example, 120 and 130 are arranged shuttles $\mathbf{107_1}$ and $\mathbf{107_2}$ for word lines and in 131 and 132 are arranged shuttles $\mathbf{107_3}$ and $\mathbf{107_4}$ (described later with reference to FIG. 10) for weaving the plane in the form of a ribbon cable.

A picking device for simultaneously moving two upper and lower shuttles, for example, $\mathbf{107_1}$ and $\mathbf{107_2}$ shall be explained in the following. On the left and right in FIG. 9 are upper and lower shuttle boxes 120, 120' and 130, 130' corresponding to the upper and lower sheds A and B. Corresponding to the shuttle boxes 120 and 130 are two picker spindles 160 and 161. In the same manner, corresponding to the shuttle boxes 120' and 130' are two picker spindles 162 and 163. The above mentioned picker spindles are passed respectively through pickers 164, 165, 166 and 167 and are fixed at both ends to the reed frame legs. The above mentioned pickers are so made as to be able to move horizontally along the respective picker spindles. The above mentioned pickers 164, 165, 166 and 167 will pick and convey the shuttles in the respective corresponding shuttle boxes into the corresponding shuttle boxes on the other side and will also receive the shuttles picked and conveyed from the other side. Each of the above mentioned pickers has a hole in the vertical direction. The upper part of a picking stick 168 passes through the pickers 164 and 165 and the upper part of a picking stick 169 passes through the pickers 166 and 167. The picking sticks 168 and 169 will alternately operate to make a picking motion by the action of two picking cams (not illustrated) provided on the shaft 112 (FIG. 5) and will simultaneously pick and convey two shuttles on the upper and lower stages to the other side.

Now the shuttle replacing operation shall be briefly explained. Assume that in the shuttle box 120 is the shuttle $\mathbf{107_1}$ and in the shuttle box 130 is the shuttle $\mathbf{107_2}$ and that these shuttles hold insulatively coated soft copper wires for respectively arranging the upper and lower word lines. In such case, if, for example, the shuttle $107_1$ is made to hold red insulatively coated wire and the shuttle $107_2$ is made to hold a blue insulatively coated wire, it will be easy and convenient to distinguish the upper and lower word lines after the weaving. In the shuttle boxes 131 and 132 are respectively the shuttles $107_3$ and $107_4$ having insulated strings for weaving ribbon cables. The four-stage shuttle boxes 120, 130, 131 and 132 are made integral and are moved up and down by two stages by such shuttle replacing method well known in the fiber loom as, for example, by the presence or absence of a perforation or peg. The operating relation between the operations of the shuttle boxes and shuttles in the above mentioned state and the warps shall be explained with reference to FIGS. 10A–10B.

Figure 10A:
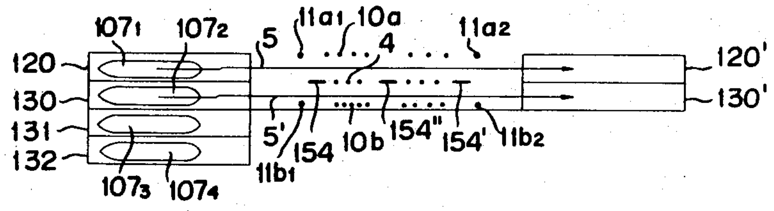
FIGS. 10A through 10D are diagrammatic views illustrating the relations between shuttle boxes, shuttles and warp.
Figure 10B:
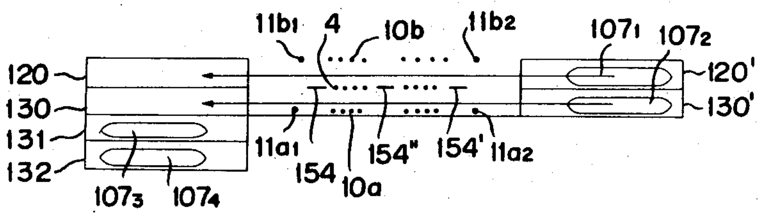

In FIG. 10A, the above mentioned four-stage slays are in the lowered positions, the shuttle boxes 120 and 120′ correspond to the upper stage sheds and the shuttle boxes 130 and 130′ correspond to the lower stage sheds. Further, the weft clamping strings $11a_1$ and $11a_2$ and the insulated string group $10_a$ shed above to form an upper stage shed and the weft clamping strings $11b_1$ and $11b_2$ and the insulated string group $10_b$ shed below to form a lower stage shed. In such state, if the shuttles $107_1$ and $107_2$ respectively in the left side shuttle boxes 120 and 130 are simultaneously picked rightward by the picking stick 168 (FIG. 9), the shuttles $107_1$ and $107_2$ will be respectively moved to the right side shuttle boxes 120′ and 130′ through the upper and lower sheds. Then the wefts will be beaten, at the same time the above mentioned weft clamping strings and insulated string group will be alternated in the upper and lower positions, the fabric will be wound up by a fixed length and the state in FIG. 10B will be attained. In this state, the shuttles $107_1$ and $107_2$ in the shuttle boxes 120′ and 130′ will be returned respectively to the shuttle boxes 120 and 130 by the operation of the picking stick 169 (FIG. 9).

Then as described above, the wefts will be beaten, the warps will be alternated in the upper and lower position, the fabric will be wound up and the above mentioned operations will be repeated so that the memory part P (FIG. 8) of the memory plane may be woven. In such case, when the word lines woven in are counted by the shuttle replacing program card and a number of word lines set in advance in the shuttle replacing program card have been woven in, the shuttle replacing device will operate to automatically elevate the above mentioned four-stage shuttle boxes by two stages so as to be in the stage of FIG. 10C. In this state, the left side picking stick will operate to convey the shuttle $107_3$ in the shuttle box 131 and the shuttle $107_4$ in the shuttle box 132 respectively to the shuttle boxes 120′ and 130′ through the upper and lower sheds and, as mentioned above, the wefts will be beaten, the warps will be alternated in the upper and lower positions and the fabric will be wound up so that the state of FIG. 10D may be made. Here, the shuttle $107_3$ in the shuttle box 120′ and the shuttle $107_4$ in the shuttle box 130′ will be returned respectively to the shuttle boxes 131 and 132 through the upper and lower stage sheds as mentioned above by the operation of the right side picking stick, the wefts will be beaten, the warps will be alternated in the upper and lower positions and the fabric will be wound up.

Figure 10C:
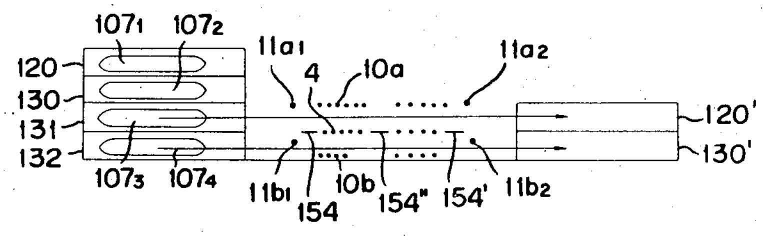
Figure 10D:
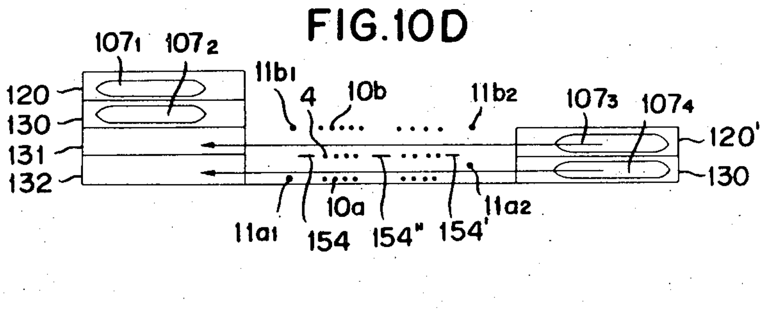

By repeating the operations in FIGS. 10C and 10D as mentioned above, the ribbon cable part R (FIG. 8) of the memory plane will be woven. When a predetermined number of insulated strings have been woven in, the above mentioned shuttle replacing program card will control the shuttle replacing device so that the above mentioned four-stage shuttle boxes may be lowered by two stages to return to the state of FIG. 10A and the weaving of the next memory plane will automatically start.

In FIGS. 10A–10D is shown an embodiment in which, as an example of weaving a wide memory plane, a tenterhook 154″ is arranged in the middle part in addition to the tenterhooks 154 and 154′.

Thus, by automatically replacing shuttles, the memory part and ribbon cable part can be alternately woven and at the same time many memory planes can be woven continuously and efficiently.

In the above memory plane weaving apparatus, there has been explained a method wherein one weft is arranged simultaneously in each of the two-stage sheds A and B and then the wefts are beaten to weave a memory plane in this manner in turn. This method is adapted to weave word lines in the form of tapes and has an advantage that the number of turns of each word is so small that the weaving velocity will be high and the tensions of the upper and lower wefts will be balanced.

A method of weaving word lines of a diameter of about 0.08 mm. as multi-turns shall be described in the following. In this method, one weft is passed, for example, through the upper stage shed A, is then turned and is passed through the lower stage shed B from the other side so that one word line pair may be arranged above and below the memory line group and then the weft is beaten to weave a memory plane so that a connection such as by soldering may not be required in the middle of one word line pair set.

The producing method according to the present invention shall be explained with reference to an embodiment wherein a memory device is made by forming one word line pair set by arranging two word line pairs in series as shown in FIGS. 4B and 4D.

Further, from the later explanation, it will be clear that the producing method according to the present invention can be effectively applied also to such word line formation as is shown in FIG. 3A or FIGS. 4A and 4C.

FIGS. 11A–11F show relations between the vertical motions of the right and left shuttle boxes and motions of the shuttles and the motions of the insulated strings and weft clamping strings. These relations shall be explained with reference to the explanatory view of a memory device in the weaving shown in FIG. 12. The shuttle $107_a$ contained in the shuttle box 140 holds an insulated string for weaving a ribbon cable part R, the shuttle $107_b$ contained in the shuttle box 141 holds a red insulatively coated line for odd number word line pair sets $W_1$, $W_2$, — — — and the shuttle $107_a$ contained in the shuttle box 142 holds a blue insulatively coated line for even number word lines.

Between the weft clamping strings $12a_1$, $12b_1$ and $12a_2$, $12b_2$ are arranged metal wires $13_a$ and $13_b$ which are piano wires or the like highly resilient wires and are smooth on the surface. The above mentioned weft clamping strings and piano wires are passed through two special narrow shedding heddles (later described with reference to FIGS. 13A–13F) which will be alternated in the upper and lower positions only when an operation of replacing either shuttle is made. Each of the piano wires $13_a$ and $13_b$ is woven at the front end into the fabric in the same manner as each of the tenterhooks 154 and 154' but is fixed at the rear end to the rocking back beam 101 (FIGS. 5). The above mentioned weft clamping strings $13a_1$ and $12b_1$, piano wires $13_a$ and $13_b$ and weft clamping strings $12a_2$ and $12b_2$ will always keep the same shed state and therefore will not act at all on the wefts while the shuttles are not replaced but will be alternated in the upper and lower positions at the same time as the shuttles are replaced. Thus, the piano wires $13_a$ and $13_b$ together with the weft clamping strings $12a_1$, $12b_1$ and $12a_2$, $12b_2$ on both sides of them will be alternated in the upper and lower positions and will clamp the word lines so as to form shedding lines of the respective word line pair sets $W_1$, $W_2$, $W_3$, — — — when a specific number of word line pairs (two word line pairs in this embodiment) have been woven in. Therefore, the word line pair sets $W_1$, $W_2$, $W_3$, — — — are formed of only one line so that no connection in the middle is required. Further, in the same manner as the tenterhooks, the piano wires will easily disengage from the fabric as the fabric is wound up. Then the weft clamping strings $12a_3$ and $12b_3$ will be passed through the same shedding heddles 104' and 105' (later described with reference to FIGS. 13A–13F as the insulated string groups $10_a$ and $10_b$, will clamp the wefts woven in while no shuttle replacing operation is made and will at the same time bind the lead lines of the word lines so that the tenterhook 154 may be made effective and at the same time, as described above, may be easily pulled out.

As described above, in this embodiment, until one weft passes, for example, first through the upper stage shed from left to right and then through the lower stage shed from right to left, the insulated string groups $10_a$ and $10_b$ will continue the same shed state. Therefore, the heddles 104' and 105' (FIG. 13A) for shedding the insulated strings can not be used in common in shedding the weft clamping strings $12a_4$ and $12b_4$ on the right side. Therefore, in this embodiment, two other narrow heddles 182, and 183 (FIG. 13A) for the weft clamping strings $12a_4$ and $12b_4$ are provided so that the weft clamping strings $12a_4$ and $12b_4$ may be shed by being passed through said heddles. The summary of the embodiment has been explained in the above. The embodiment shall be explained in detail in the following with reference to FIGS. 11A, B, — — — F in turn.

Figures 11A, 11B, 11C, 11D, 11E, 11F:
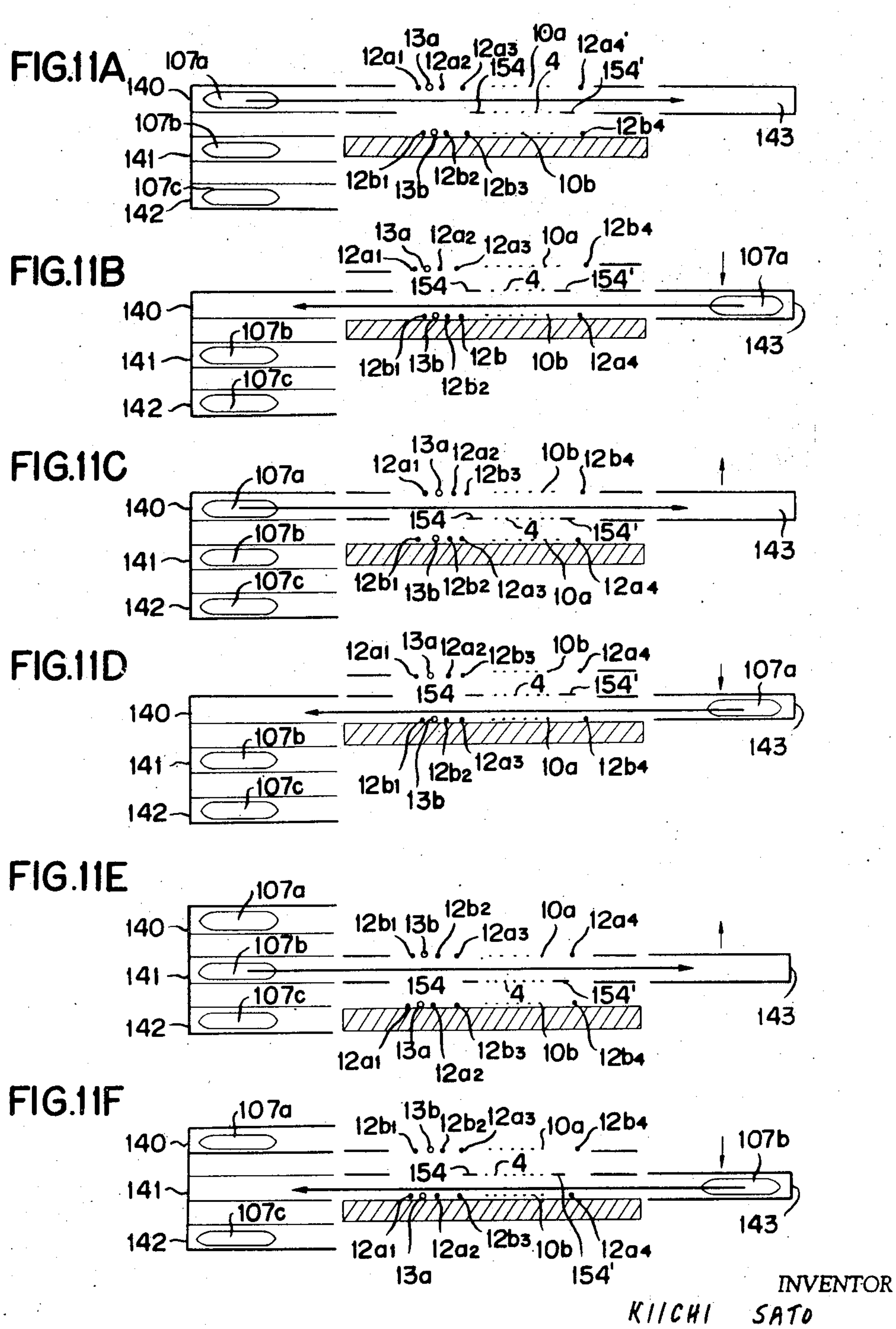
FIGS. 11A through 11F are diagrammatic views illustrating the vertical shifting of shuttle boxes.

First of all, assume that, as in FIG. 11A, the left shuttle box 140 and right shuttle box 143 are opposed to the upper stage shed and the weft clamping strings $12a_1$ and $12b_1$, piano wires *13a* and *13b*, weft clamping strings $12a_2$, $12b_2$, $12a_3$ and $12b_3$ and insulated string groups *10a* and *10b* and weft clamping strings $12a_4$ and $12b_4$ are arranged as shown in the drawing. In this state, when the picking device acts on the shuttle 107a for weaving ribbon cables contained in the shed 140, the shuttle 107a will pass through the upper stage shed and will be picked and conveyed to the shuttle box 143 opposed to it. While the crank shaft makes one rotation in this state, the reed will advance but will make no complete weft beating but only a semi-beating. The semi-beating shall be described in detail in the explanation of FIGS. 13A–13F. At the same time, the weft clamping strings $12a_4$ and $12b_4$ will be alternated in the upper and lower positions, the shuttle boxes on both sides will be lowered by one stage and the state in FIG. 11B will be attained. When the operation of picking the shuttle from the right side is made in this state, the shuttle 107a will pass through the lower stage shed and will return to the shuttle box 140, complete weft beating (which shall be described in detail in the explanation of FIGS. 13A–13F) will be made and at the same time the following operations will be carried out:

1. The insulated string groups 10a and 10b and weft clamping strings $12a_3$ and $12b_3$ will be alternated in the upper and lower positions.
2. The right and left shuttle boxes will be elevated by one stage.
3. The fabric will be wound up. (In the case of FIGS. 4C and 4D, it will not be wound up or a only small amount of it will be wound up.)

By the above, the state of FIG. 11C will be attained and the shuttle 107a will be conveyed to the shuttle box 143 through the upper stage shed. Then the reed 106 will make a semi-beating as mentioned above, at the same time the weft clamping strings $12a_4$ and $12b_4$ will be alternated in the upper and lower positions, the shuttle boxes on both sides will be lowered by one stage, the state of FIG. 11D will be attained, the shuttle 107a will return to the original shuttle box 140 through the lower stage shed and then the following operations will be carried out:

1. Complete weft beating will be made.
2. The insulated string groups 10a and 10b and weft clamping strings $12a_3$ and $12b_3$ will be alternated in the upper and lower positions.
3. The right and left shuttle boxes will be elevated by one stage.
4. The fabric will be wound up.

By repeating the above operations, the ribbon cable part will be woven. When the ribbon cable part of a fixed length has been woven, as explained in the above mentioned embodiment, by the information of the shuttle replacing program card, the shuttle replacing device will operate, the left side shuttle boxes will be further elevated by two stages, the state of FIG. 11D will become the state of FIG. 11E and the operation of weaving the first word line pair set $W_1$ (of an odd number) will begin. With the operation of the shuttle replacing device, the weft clamping strings $12a_1$ and $12b_2$ will be alternated in the upper and lower positions and will be ready to clamp the first lines (lead lines) of the first word line pair set $W_1$. When the shuttle 107b (red line) in the shuttle box 141 is conveyed to the shuttle box 143 through the upper stage shed in this state, the first lead lines of the first word lines will be clamped by the weft clamping strings $12a_1$ and $12b_1$, piano wires *13a* and *13b* and weft clamping strings $12a_2$ and $12b_2$. Then the wefts will be semi-beaten by the reed 106, the weft clamping strings $12a_4$ and $12b_4$ will be alternated in the upper and lower positions, the right and left shuttle boxes will be lowered by one stage and the state of FIG. 11F will be attained. The difference of this state from the state of FIG. 11B is only that the left side shuttle boxes are elevated by two stages and the weft clamping strings $12a_1$ and $12b_1$, piano wires 13*a* and 13*b* and weft clamping strings $12a_2$ and $12b_2$ are alternated in the upper and lower positions. This difference of the state will be the same also between FIGS. 11A and 11E and will be continued until the weaving of the first word line pair set $W_1$ ends. Thus, the shuttle 107*b* will pass alternately through the upper stage shed and lower stage shed to weave them and only the lead lines will be clamped by the weft clamping strings $12a_1$ and $12b_1$ but the other word line pairs, the same as in the case of the ribbon cable part, will not be clamped by the weft clamping strings $12a_1$, $12b_1$, $12a_2$ and $12b_2$ but will be clamped by the weft clamping strings $12a_3$ and $12b_3$.

Then the operation of weaving the second word line pair set (even number) $W_2$ is exactly the same as in the case of the first word line pair set except only the difference that the shuttle replacing device will further elevate the left side shuttle boxes by two stages and at the same time the weft clamping strings $12a_1$ and $12b_1$, piano wires 13*a* and 13*b* and weft clamping strings $12a_2$ and $12b_2$ will be reversed.

When the word line pair sets of odd and even numbers are alternately woven until a predetermined number of word lines are woven, by the information from the shuttle replacing program card, the left side shuttle boxes will lower and the state of FIG. 11A will return.

The reason for differently coloring the odd number word line and even number word line in the above mentioned explanation is to make it easy to distinguish the word line numbers after the weaving.

Figure 12:
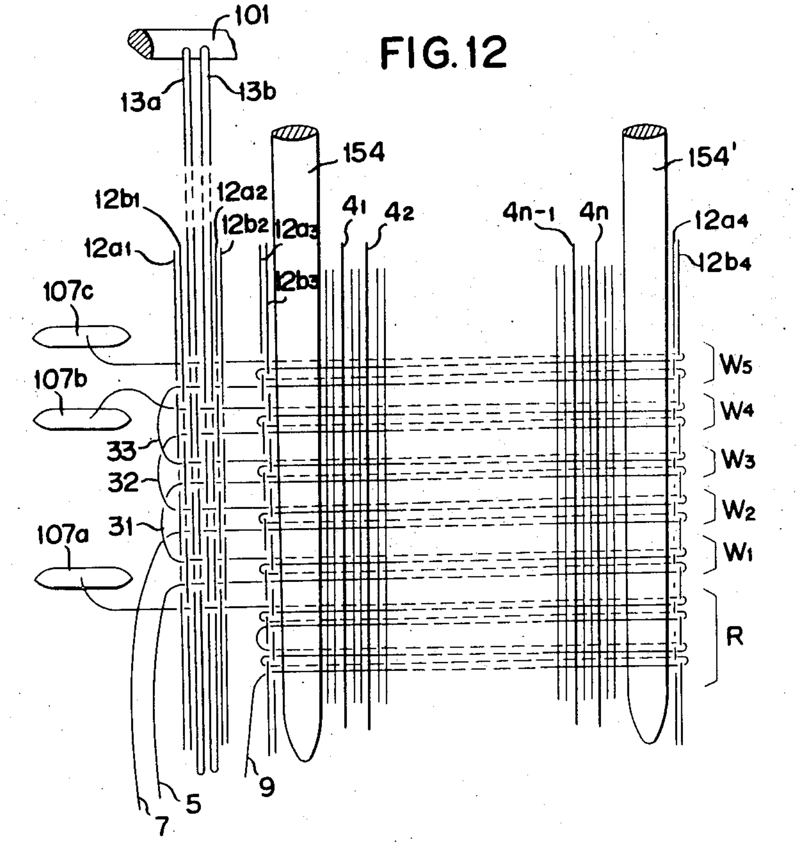
FIG. 12 is a plan view illustrating the weaving of a memory plane embodying the invention.

FIG. 12 shows a state of the composition of warps and wefts in a memory plane in the weaving by this embodiment. From FIG. 12, it will be understood how the weft clamping strings $13a_1$, $12b_1$, $12a_2$ and $12b_2$ and piano wires 13*a* and 13*b* clamp the wefts and lead lines. In the drawing, R represents a ribbon cable part and $W_1$, $W_2$, $W_3$, $W_4$ and $W_5$ respectively represent word lines of odd and even numbers. Further, 31, 32 and 33 in the same drawing represent lead line loops. After the weaving, these loops will be cut and the weft clamping strings $13a_1$, $12b_1$, $12a_2$ and $12b_2$ will be released off as in FIG. 4B or 4D.

Figures 13A, 13C:
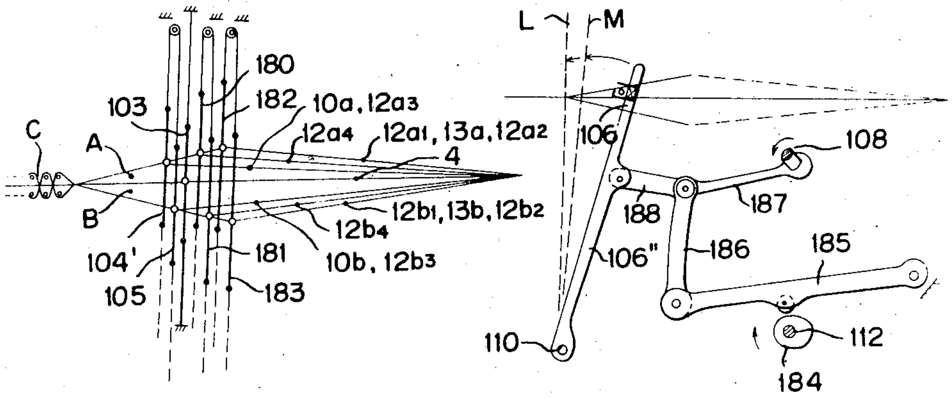
FIG. 13A is a somewhat diagrammatic elevation view of the shedding motion for insulated strings, weft clamping strings and piano wires.
FIG. 13C is a partial elevation view illustrating means for controlling the weft beating motion of a reed.
Figure 13B:
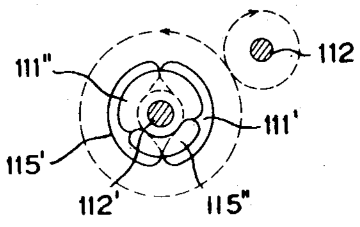
FIG. 13B is a partly schematic elevation view of a cam for effecting the shedding motion of FIG. 13A.
Figure 13D:
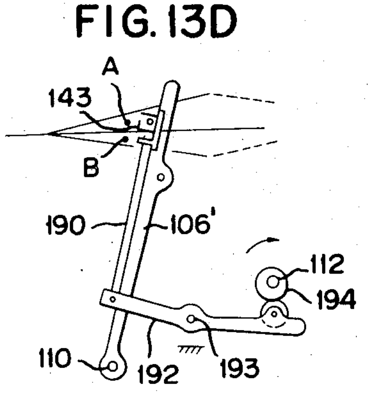
FIGS. 13D and 13E are partial elevation views illustrating the vertical motion of a shuttle box.
Figure 13E:
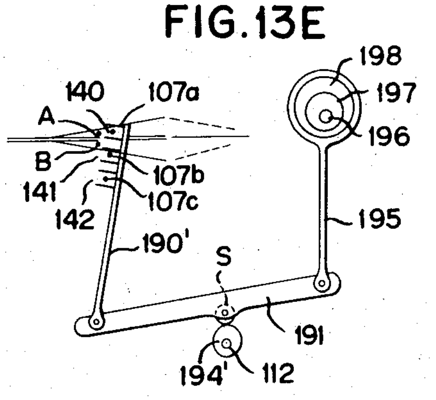
Figure 13F:
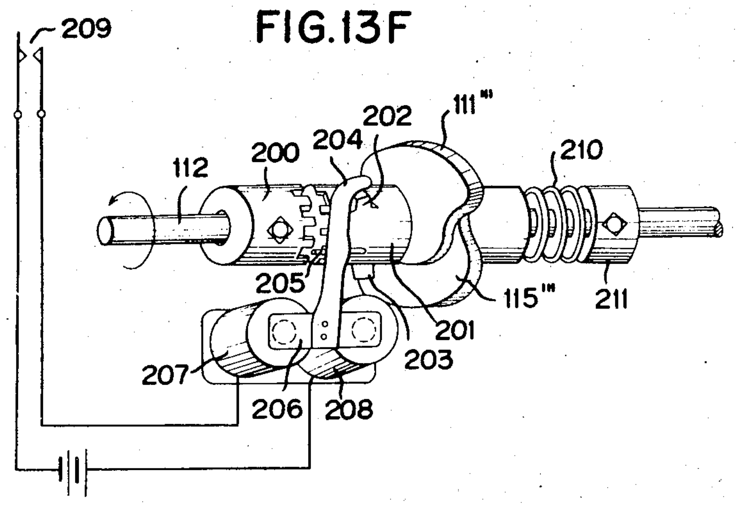

FIGS. 13A–13F show an additional device and additional function in this embodiment. FIG. 13A is to explain a method of shedding the insulated string groups 10*a* and 10*b*, weft clamping strings $13a_1$, $12b_1$, $12a_2$, $12b_2$, $12a_3$, $12b_3$, $12a_4$ and $12b_4$ and piano wires 13*a* and 13*b*. FIG. 13B shows a cam for shedding the insulated string groups 10*a* and 10*b* and weft clamping strings $12a_4$ and $12b_4$. FIG. 13C shows an example of a method of making the reed 106 semi-beat or completely beat wefts. FIG. 13D shows a device for alternately moving the shuttle boxes up and down by one stage to pass the shuttle alternately through the upper stage shed and lower stage shed. Further, FIG. 13F shows a device for alternating the weft clamping strings $12a_1$ and $12b_1$, piano wires 13*a* and 13*b* and weft clamping strings $12a_2$ and 12 $b_2$ in the upper and lower positions in replacing the shuttle.

In FIG. 13A, through the shedding heddle 104' will be passed the insulated string group 10*a* and weft clamping string $12a_3$ and through the shedding heddle 105' will be passed the insulated string group 10*b* and weft clamping string $12b_3$.

The above mentioned heddle 104' is so made as to be pulled upward to form the upper stage shed A while the crank shaft makes two rotations and to be pulled downward to form the lower stage shed B while the crank shaft makes the next two rotations. Further, the heddle 105' will operate reversely to the above mentioned heddle 104'. That is to say, it will operate to keep the same shed state until the shuttle makes one reciprocation through the upper and lower sheds to arrange a pair of wefts above and below the memory line group and will operate to be in the reverse upper and lower positions while the shuttle makes the next one reciprocation. Through the fixed heddle 103 will be passed the memory line group 4 in the same manner as in FIG. 5. Through a heedle 182 will be passed the weft clamping string 12*a*, piano wire 13*a* and weft clamping string $12a_2$ and through a heddle 183 will be passed the weft clamping string $12b_1$, piano wire 13*b* and weft clamping string 12 $b_2$ so that, at the normal time either one may remain pulled up but the other may remain pulled down and that, at the same time as the left side shuttle boxes operate to replace either shuttle, the heddles 182 and 183 may be alternated in the upper and lower positions. Through a heddle 180 will be passed the weft clamping string $12a_4$ and through a heddle 181 will be passed the weft clamping string $12b_4$ so that, when the shuttle has been conveyed from the left side shuttle box to the right side shuttle box, the heddles 180 and 181 may be alternated in the reverse upper and lower positions to operate to clamp the weft, that, during the next two rotations of the crank shaft, they keep this state and that, during the further next two rotations of the crank shaft, they may operate to be alternated in the reverse upper and lower positions.

FIG. 13B shows an example of operating the heddles 104', 105', 180 and 181 as mentioned above. In this figure, 112 is a shaft which will make one-half rotation while the crank shaft 108 *FIG. 5) makes one rotation and will drive a shaft 112' through a gearing so that the rotating velocity of the shaft 112' may be one-half that of the shaft 112. Therefore, the shaft 112' will make one rotation every 4 rotations of the crank shaft 108. A cam 111' is related with the heddle 104' and a cam 115' is related with the heddle 106' so that the heddles 104' and 105' may be operated to move alternately up and down as explained in FIG. 5. Further, cams 111'' and 115'' are in phase relations deviated by 90° respectively from the cams 111' and 115', the cam 111'' is related with the heddle 180 and the cam 115'' is related with the heddle 181 so that the weft clamping strings 12*a* and 12*b* may operate as mentioned above.

FIG. 13C shows an example of a device for making the reed 106 alternately semi-beat and completely beat wefts. The reason for alternately semi-beating and completely beating wefts is that, when the weft is completely beaten while the weft is passed through only the upper stage shed as in FIG. 11A and is again completely beaten after it is passed through the lower stage shed in FIG. 13B, there will be disadvantages that the weft beating to the word lines passed through the upper stage shed will be so strong that the upper and lower lines of the word line pair will not be arranged correctly above and below and that the friction between the reed and warp will increase. Further, if the weft is passed through the upper stage shed in the state of FIG. 11A, is not beaten at all and is passed also through the lower stage shed in the state of FIG. 11B, the weft clamping strings $12a_4$ and $12b_4$ will not be shed sufficiently to pass the shuttle. Further, the reason for using the weft clamping strings $12a_4$ and $12b_4$ is that, when the weft is clamped directly with the tenterhook 154' without using the weft clamping strings $12a_4$ and $12b_4$, due to the friction between the weft and the tenterhook, the fabric will not be able to be smoothly pulled off the tenterhook. In the state shown in FIG. 13C, as the base part of a cam 184 fixed to the shaft 112 is opposed to the lever 185, this said lever has lowered, the connecting rods 187 and 188 are in the form of V and, even if the crank shaft 108 rotates and the reed frame leg 106'' advances leftward, the reed 106 will advance to the dotted line M and will semi-beat the weft. In the next rotation of the crank shaft, at the time of beating the weft, the lobe of the cam 184 will act on the lever 185, the connecting rods 187 and 188 will become straight and therefore the reed will advance to the position of the dotted line L and will completely beat the weft. Thus the reed 106 will alternately repeat the semi-beating and complete beating.

In this embodiment, as mentioned above, one weft will be first passed, for example, through the upper stage shed, will be semi-beaten, will be turned, will be passed through the lower stage shed and will then be completely beaten and the above mentioned weft inserting operation will be repeated so that the fundamental object of this embodiment may be attained. In order to automatically carry out such weft inserting method as is mentioned above, while the crank shaft makes the first one rotation, the shuttle boxes on both right and left sides should be in the upper stage position so that the shuttle in the shuttle box may be opposed to the upper stage shed and, while the crank shaft makes the next one rotation, the shuttle boxes on both right and left side should be lowered to the lower stage position so that the shuttle in the shuttle box may be opposed to the lower stage shed. FIG. 13D shows a device for making such vertical motion of the shuttle box as is mentioned above. In this figure, when a cam 194 is fixed to the shaft 112 and its lobe acts on the lever 192 having the shaft 193 as a fulcrum, the connecting rod 190 and the right side shuttle box 143 will be elevated to the upper stage shed and, when the base part of the cam 194 acts on the lever 192, the connecting rod 190 and the right side shuttle box 143 will be lowered to the position of the lower stage shed. FIG. 13E is to explain the vertical motion of the left side shuttle box. The left side shuttle box, too, can be moved up and down in the same manner, for example, as shown in FIG. 13D. Further, with the shuttle replacing device, as explained in the above mentioned embodiment, the shuttle will be automatically replaced by the presence or absence of a perforation or peg in the shuttle replacing program card. That is to say, in FIG. 13E, the left side shuttle boxes 140, 141 and 142 will be alternately moved up and down by one stage by the cam 194' and the shuttle will be replaced when eccentric wheels 197 and 198 are controlled by the shuttle replacing program card so that either one or both of these eccentric wheels may be rotated by a half rotation. The shaft 196 is fixed to the body of the loom. When the eccentric wheels 197 and 198 and the cam 194' are in the state shown in FIG. 13E, the shuttle box 140 will be opposed to the upper stage shed A. As mentioned above, the shaft 112 will make one-half rotation whenever the crank shaft makes one rotation. Therefore, when the crank shaft makes one rotation from the state shown, the base part of the cam 194' will be opposed to the lever 191 and the shuttle box 140 will be lowered by one stage to be opposed to the lower stage shed B. By repleating the above mentioned operations in turn, the ribbon cable part of the memory plane will be woven. When weaving has ended, the shuttle box 140 will be opposed to the lower stage shed. When the eccentric wheel 197 is rotated by a half rotation by the information of the shuttle replacing program card, as the upper part of the rod 195 is ring-shaped to enclose the eccentric wheels 197 and 198, the rod 195 will lower and at the same time the lobe of the cam 194' will be opposed to the lever 191 so that the rod 190' and the left side shuttle boxes may be elevated and the shuttle box 141 may be opposed to the upper stage shed A. In such case, the left side shuttle boxes will rise by three stages of the shed. In such state, the weaving of the first word line pair set $W_1$ (of odd numbers) will start. When the weaving of this word line pair set ends, by the information of the shuttle replacing program card, the eccentric wheel 198 will make a half rotation and, at the same time, by the action of the above mentioned cam 194', the left side shuttle boxes will be again elevated by three stages of the sheds so that the shuttle box 142 may be opposed to the upper stage shed A and the weaving of the second word lines will be started. When the weaving of the second word lines ends, the eccentric wheels 197 and 198 will simultaneously make a half rotation and, at the same time, by the action of the cam 194', the left side shuttle boxes will be lowered by five stages of the sheds so that the shuttle box 140 may be opposed to the upper stage shed A and thus the state of FIG. 13E will return. The operation of the heddles 182 and 183 to shed the weft clamping strings $12a_1$ and $12b_1$, piano wires $13a$ and $13b$ and weft clamping strings $12a_2$ and $12b_2$ is as follows. To the above mentioned heddles 182 and 183 are respectively connected the same levers (not illustrated) as the levers 113 and 114 in FIG. 5 so as to be operated by the cams 111''' and 115''' in FIG. 13F. These cams form a part of a half-rotation type clutch mechanism on the shaft 112. Normally the projection 202 will engage with a stopper lever 204 and will stop in the position shown in the drawing so that, as shown in FIG. 13A, the heddle 182 may be elevated and the heddle 183 may remain in the lowered position. The shaft 112 will be rotated in the direction indicated by the arrow. On shaft 112 are fixed a drive gear 200 and a stopper ring 211. The left side of a cam sleeve 201 opposite the gear 200 is made in the form of a gear. But normally the cam sleeve 201 will be pressed rightward by the stopper lever 204. The above mentioned stopper lever 204 has a shaft 205 as a fulcrum and has an armature 206 of electromagnets 207 and 208 fixed to the other end.

When a shuttle replacing information issued from the shuttle replacing program card, the contact 209 will be closed for a short time to operate the electromagnets 207 and 208 to attract the armature 206 of the stopper lever 204 and stopper lever 204 will be disengaged from the projection 202. Thereby the cam sleeve 201 and cams 111''' and 115''' will be pushed leftward by a spring 210 so that the teeth of the cam sleeve 201 may mesh with those of the drive gear 200, cam sleeve 201 will make a half rotation, the stopper lever 204 will engage with a projection 203 and the cam sleeve 201 will be pushed rightward and will stop. The half rotation of the above mentioned cam sleeve will reverse the positions of the cams 111''' and 115''' so that the heddles 182 and 183 may be alternated in the upper and lower positions. When the next shuttle replacing information issued from the shuttle replacing program card, the same operation as is mentioned above will be made and the cams 111''' and 115''' will further make a half rotation so that the heddles 182 and 183 may be alternated in the upper and lower positions and thus the initial state will return.

As mentioned above, whenever the shuttle is replaced, the heddles 111''' and 115''' will be alternated in the upper and lower positions and the weft clamping strings $12a_1$ and $12b_1$, piano wires 13*a* and 13*b* and weft clamping strings $12a_2$ and $12b_2$ will be also alternated in the upper and lower positions.

Figure 14:
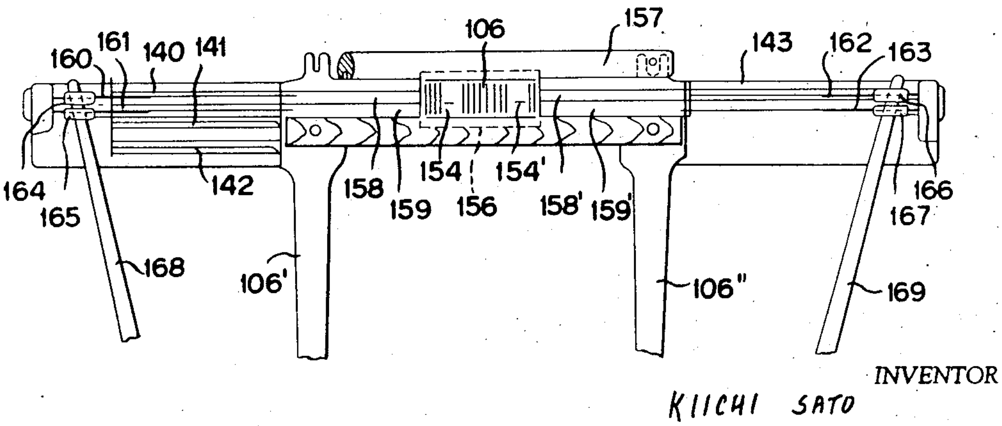
FIG. 14 is a somewhat schematic elevation view illustrating an additional shuttle operating means.

FIG. 14 shows a part of the structure of a loom for making memory planes by this embodiment and is an explanatory view of an additional device for operating the shuttle. In the drawing are shown a reed 106, fixed slays 158, 158' and 159, 159' on both sides of it, shuttle boxes 140, 141 and 142 on the left side, shuttle box 143 on the right side, picker spindles 160, 161, 162 and 163, pickers 164, 165, 166 and 167, picking sticks 168 and 169, reed frame legs 106' and 106'', tenterhooks 154 and 154', reed frame 156 and reed cap 157. The general structure is the same as in the explanatory view shown in FIG. 9.

In FIG. 14, the picker 164 is for picking the shuttle into the upper stage shed and the picket 165 will receive the shuttle coming by being moved through the lower stage shed from the right side shuttle box 143. Further, the picker 166 will receive the shuttle coming through the upper stage shed from the left side shuttle box. The picker 167 will pick and convey the shuttle from the right side shuttle box to the left side shuttle box through the lower stage shed. Each of the shuttle boxes 140, 141 and 142 on the left side is provided with an interval corresponding to the height of the shed so that the pickers 164 and 165 may not simultaneously act on two shuttles.

In the above described embodiment, in winding up the fabric, if the teeth of the winding ratchet wheel are driven by the reciprocating motion of the reed frame leg operatively connected with the crank shaft 108, the word line pairs will be arranged at uniform intervals as shown in FIGS. 4A and 4B. In order to weave a memory plane in which two word line pairs are made close as shown in FIGS. 4C and 4D, if the teeth of the winding ratchet wheel are driven through levers by the cam fixed to the shaft 112' (FIG. 13B), the interval between the word line pairs of one word line will become close and the interval between the word lines will become coarse. That is to say, in order that one word line pair set may be formed of two or more word line pairs, that the interval between the respective word line pairs forming one word line pair set may be close and that the interval between the word line pair sets may be coarse, while the respective word line pairs in one word line pair set are being woven, the winding of the fabric should be stopped or a small amount of winding should be made and, only when the next word line weaving is to be started, a large amount of winding should be made to attain the object. In such winding method, the rotating velocity of the cam shaft to drive the teeth of the winding ratchet wheel may be properly reduced or the amount of feeding the teeth of the winding ratchet wheel may be controlled by the shuttle replacing program card.

Now, as regard the arrangement of warps, memory planes of many different arrangements and densities of warps can be freely obtained by making the thicknesses and numbers of the memory lines and insulated strings proper, adapting the thicknesses and intervals of the reed plates of the reed for beating wefts and passing the memory lines and insulated strings separately through respective corresponding heddle elements (for example, as in FIG. 2E, when the insulated memory lines are closely arranged, through between the reed plates, two will be passed as arranged but, through the heddle elements, they will be passed as separated).

Further, in FIG. 5, the reed 150 is the same as the reed 106 for beating wefts, will make the shedding easy between both reeds and will prevent friction between the memory line and insulated string.

Figure 15:
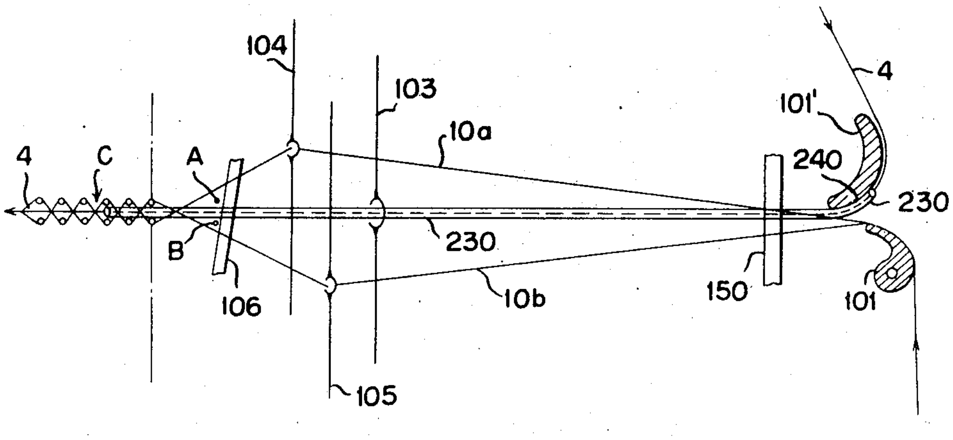
FIGS. 15 and 16A are schematic elevation views illustrating other methods of making memory planes embodying the invention.

FIG. 15 shows a device for protecting magnetic film coated memory lines to be used in working the present invention. In the drawing, 230 is a fine protective pipe made of a metal or plastics and having an inside diameter large enough to easily pass the memory line 4. Through many of the above mentioned pipes are respectively passed the memory lines $4_1$, $4_2$, $4_3$, — — — . (In the drawing is shown only the pipe 230 for the memory line 4.) Pipes 230 passes through the weft beating reed 106, fixed heddle 103 and fixed reed 150 and is so made as to be fixed at the rear end at 240 to the back beam 101' with a binder or the like and to be woven a little at the front end into the fabric C. Therefore, during the weaving, the memory lines $4_1$, $4_2$, $4_3$, — — — will not come into direct contact with the weft beating reed 106, shedding heddles 104 and 105, fixed heddle 108, fixed reed 150, adjacent insulated strings 10*a* and 10*b* and shuttles (not illustrated) reciprocating through the upper and lower sheds A and B and therefore damage and twisting of the memory lines can be prevented. Further, as the above mentioned pipe is fixed at the rear end as mentioned above, with the program of the weaving, the fabric C will be wound up and pipe 230 will automatically escape out of the fabric. There are effects that, when the fabric disengages from the pipes, the wefts woven in will be relaxed, the shrinkage of the woven width will be reduced and, at the same time, the memory lines will be prevented from being fastened too strongly.

Figure 16A:
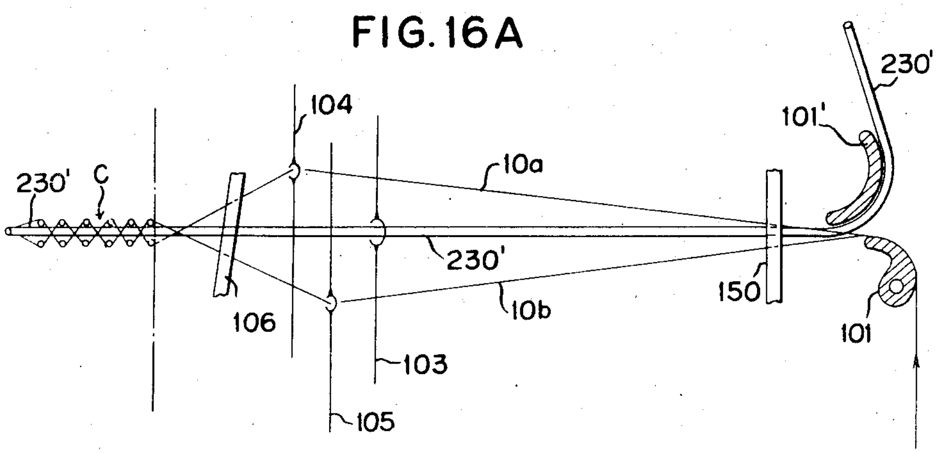
Figure 16B:
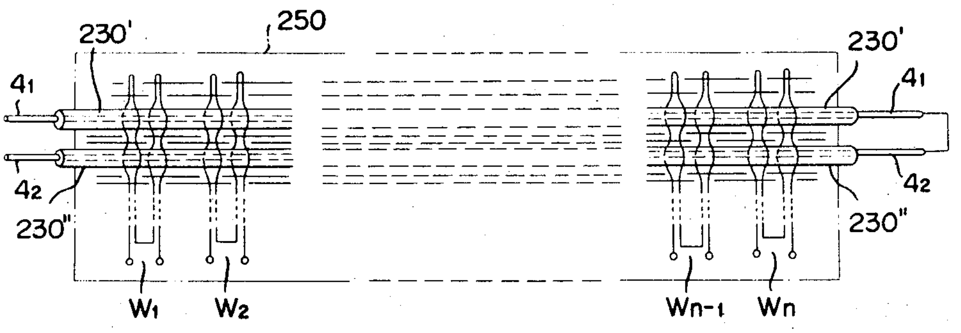
FIG. 16B is a somewhat schematic plan view corresponding to FIG. 16A.

FIG. 16A and 16B show another method of preventing damage to memory lines. In these figures, a memory device is made by weaving in only plastic pipes, instead of memory lines, by the already described method, cutting the fabric to be of the length of one module of the memory device (or the length of one plane) after the waving and then inserting memory lines into the plastic pipes. That is to say, 230′ in FIG. 16A is such rather hard, highly elastic, linear, fine and insulative pipe as, for example, a glass or plastic pipe and the weaving is carried out in the same manner as in the above mentioned direct weaving of memory lines. The woven fabric C is cut to the length of one module of the memory device or the length of one plane and the memory lines $4_1$, $4_2$, $4_3$, — — — are inserted respectively into the pipes 230′ and 230″ to make the memory device. If a memory device is made by this method, there will be advantages that damage to memory lines in the weaving step can be perfectly prevented and that memory lines later found to be defective can be replaced.

In the above embodiments, shuttles are used to arrange wefts in the sheds. However, it is needless to say that memory planes can be woven by arranging wefts in the upper and lower stage sheds by a needle or water-jet method and weaving them instead of using shuttles. If both the present invention and the technique of fiber looms are used, memory planes of other more complicated compositions than the patterns exemplified in FIGS. 3 and 4 can be woven. For example, if, by using a Dobby loom, in FIG. 13A, the insulated strings 10*a* and 10*b* in the longitudinal direction are passed through the heddles 104′ and 105′ and are alternated in the upper and lower positions every four rotations of the crank shaft 108 (FIG. 5) and, at the same time, the weft clamping strings $12a_3$, $12b_3$, $12b_4$ and $12b_4$ are passed through the heddles 180 and 181 and said heddles 180 and 181 are alternated in the upper and lower positions every one rotation of the crank shaft, two word line pairs will be able to be stitched and advanced. Thus, either a plurality of word line pairs in a bundle or a single word line pair and a plurality of word line pairs as mixed can be stitched and advanced. Further, in FIGS. 13D and 13E, if the phases of the cams 194 and 194′ are respectively deviated by 180°, the shuttle 107a which has come to the right side shuttle box through the upper stage shed from the left side, has then returned to the left side shuttle box through the lower stage shed and has thus circulated clockwise will now repeat an anticlockwise circulation reverse to the above. In order to circulate the shuttle clockwise or anticlockwise as mentioned above, the operation of moving the shuttle box up and down by one stage may be controlled by a shuttle replacing card or Dobby card. Further, in the above mentioned shuttle replacing device, by moving the shuttle box up and down by two, four or six stages, the welfts can be automatically replaced with any other wefts. For example, by the same method as used with the above mentioned ribbon cable part, one or a plurality of dummy line pairs can be woven in between the word line pair sets.

The method of making memory planes according to the present invention is not to pass insulated lead wires through respective cores, as in a conventional core matrix, but it can provide a cheap memory device of a high quality automatically by a mass-production. However, it is unavoidable that there is a possibility that a few word lines or digit lines may become unable to be used due to an unexpected accident or an defect in the operation in the producing process. In order to cope with such case, in the present invention, several percent or moreof word lines and digit lines is woven in advance as spare lines so that, as soon as such trouble as is mentioned above occurs, these spare lines may be used by switching.

What is claimed is:

1. The method of forming a woven wire memory plane, which comprises feeding a plurality of conductive wires coated with a film of magnetic material to form a portion of a warp feeding a plurality of insulated strings parallel to the wires to form a second portion of the warp, and weaving a weft into said warp in a series of sequential operations; each of said operations including forming a first shed with said wires and a first plurality of said strings, passing a wirelike conductor forming a portion of said weft through said first shed, forming a second shed with said wires and a second plurality of said strings, and passing a wirelike conductor forming a portion of said weft through said second shed.

2. The method as in claim 1, wherein said first and second sheds are formed simultaneously in said operations.

3. The method as in claim 1, wherein each operation includes a transition to the next operation, said transition including collapsing said sheds and reforming the sheds so said first plurality of said strings pass by the second plurality of said strings to secure said conductors which have passed through said sheds.

4. The method as in claim 1, wherein the wires are kept straight and the first and second plurality of said strings drawn by heddles to opposing sides of the wires to form the sheds in one operation and then to respective opposite sides of the wires after conductors are passed through the sheds to form the sheds in the next operation.

5. The method as in claim 1 wherein one of the first plurality of strings and one of the second plurality of strings are advanced between each pair of wires.

6. The method as in claim 1 wherein the weaving is such as to maintain each conductor passing through a shed on the same side of the wires after each operation.

7. The method as in claim 1, wherein each operation includes a transition to the next operation, said transition including collapsing said sheds and reforming the sheds so said first plurality of said strings pass by the second plurality of said strings to secure said conductors which have passed through said sheds.

8. The method as in claim 3, wherein one of the first plurality of strings and one of the second plurality of strings are advanced between each pair of wires.

9. The method as in claim 1, wherein blade shaped tenterhooks extend parallel to said wires and produce pressure to prevent shrinkage along the weft.

10. The method as in claim 9, wherein each operation includes a transition to the next operation, said transition including collapsing said sheds and reforming the sheds so said first plurality of said strings cross over the second plurality of said strings to secure said conductors which have passed through said sheds.

11. The method as in claim 9, wherein the wires are kept straight and the first and second plurality of said strings drawn by heddles to opposing sides of the wires to form the sheds in one operation and then to respective opposite sides of the wires after conductors are passed through the sheds to form the sheds in the next operation.

12. The method as in claim 9, wherein the weaving is such as to maintain each conductor passing through a shed on the same side of the wires after each operation.

13. The method as in claim 1, wherein the same conductor passes through the first shed in one direction and then the second shed in the other direction in an operation, and wherein the conductor is semibeaten after it passes through the first shed before it passes through the second shed, whereby the conductor forms a loop.

14. The method as in claim 13, wherein each operation includes a transition to the next operation, said transition including collapsing said sheds and reforming the sheds so said first plurality of said strings pass by the second plurality of said strings to secure said conductors which have passed through said sheds.

15. The method as in claim 13, wherein the wires are kept straight and the first and second plurality of said strings drawn by heddles to opposite sides of the first set to form the sheds in one operation and then to respective opposite sides of the wires after conductors are passed through the sheds to form the sheds in the next operation.

16. The method as in claim 13, wherein the weaving is such as to maintain each conductor passing through a shed on the same side of the wires after each operation.

17. The method as in claim 13, wherein blade shaped tenterhooks extend parallel to said wires and produce pressure to prevent shrinkage along the weft.

18. The method as in claim 1, wherein the same conductor is passed through the first and second shed in each of a first plurality of consecutive operations, and wherein a second conductor is passed through the first and second shed in each of a second plurality of consecutive operations, and said first conductor is passed through the first and second shed in a third plurality of consecutive operations thereaftter.

19. The method as in claim 18, wherein each operation includes a transition to the next operation, said transition including collapsing said sheds and reforming the sheds so said first plurality of said strings pass by the second plurality of said strings to secure said conductors which have passed through said sheds.

20. The method as in claim 17, wherein the wires are kept straight and the first and second plurality of said strings drawn by heddles to opposing sides of the wires to form the sheds in one operation and then to respective opposite sides of the wires after conductors are passed through the sheds to form the sheds in the next operation.

21. The method as in claim 19, wherein the weaving is such as to maintain each conductor passing through a shed on the same side of the wires after each operation.

22. The method as in claim 19, wherein blade shaped tenterhooks extend parallel to said wires and produce pressure to prevent shrinkage along the weft.

23. The method as in claim 3, wherein the weaving is such as to maintain each conductor passing through a shed on the same side of the wires after each operation.

24. The method as in claim 1, wherein said wires are passed through pipes.

25. The method as in claim 1, wherein said wires divide said first and second sheds, and wherein said wires extend along straight lines between said sheds.

26. The method of making memory devices, which comprises arranging a plurality of digit lines in a plurality of binding lines parallel to each other in a plane to form a warp group and parallel to two sword-shaped tenterhooks in the plane on opposite sides of the group, forming a fabric by producing a weft with the warp in a plurality of operations; each of said operations including drawing one set of binding lines out of the plane and from the digit line in one direction to form one shed with the digit lines and another set of binding lines out of the plane and from the digit lines in another direction to form a second shed with said digit lines, during each formation of the two sheds passing a conductor through one shed and about the tenterhooks and through the other shed by a weft-beating motion; and drawing the fabric off the tenterhooks.

27. A method of making memory planes, comprising forming a warp of digit lines, forming a portion of a weft by reciprocating a first conductor relative to the warp, clamping the weft-forming conductors with tenterhooks and weft-clamping strings, forming another portion of the weft with a second conductor, clamping the second conductor with piano wires and other weft-clamping strings, and alternately repeating these steps of forming a portion of the weft with one conductor and the other conductor and clamping the conductor.

28. The method as in claim 27, wherein the digit lines are passed through pipes loosely woven in the weft and warp.

29. The method as in claim 27, wherein the digit lines include pipes which are woven into the weft as part of the warp and further comprising the step of passing magnetically coded conductors through the pipes.

30. The method of forming a woven wire memory, which comprises establishing a warp of a plurality of elongated parallel digit line forming means in a plane and a plurality of elongated binders in the plane, and forming a weft composed of a plurality of elongated conductors by a series of operations; each of said operations including forming a first shed with said forming means and a first plurality of said binders, forming a second shed with a second plurality of said elongated binders, and passing conductors through said sheds.

31. A method as in claim 30 wherein the forming means includes tubes, and further comprises the step of passing conductors coated with magnetic material through said tubes.

32. A method as in claim 30, wherein the warp is established with forming means that include elongated conducting wires coated with a magnetic material.

* * * * *